(12) United States Patent
Baker et al.

(10) Patent No.: US 7,823,106 B2
(45) Date of Patent: Oct. 26, 2010

(54) VARIABLE PERFORMANCE RANKING AND MODIFICATION IN DESIGN FOR MANUFACTURABILITY OF CIRCUITS

(75) Inventors: Faye D. Baker, Burlington, VT (US); Mark R. Beckenbaugh, Rochester, MN (US); Jason J. Freerksen, Rochester, MN (US); Mark D. Levy, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 12/045,984

(22) Filed: Mar. 11, 2008

(65) Prior Publication Data

US 2009/0235214 A1    Sep. 17, 2009

(51) Int. Cl.
   *G06F 17/50*    (2006.01)
(52) U.S. Cl. .................. 716/5; 716/4; 716/6; 716/10; 703/14
(58) Field of Classification Search .................. 716/4–6, 716/10; 703/14
   See application file for complete search history.

(56) References Cited

U.S. PATENT DOCUMENTS

| 6,643,683 | B1 | 4/2003 | Drumm |
| 6,901,575 | B2 * | 5/2005 | Wu et al. ...................... 716/19 |
| 7,437,691 | B2 * | 10/2008 | Tang et al. ...................... 716/2 |
| 7,487,479 | B1 * | 2/2009 | Malik et al. ...................... 716/5 |
| 7,570,796 | B2 * | 8/2009 | Zafar et al. .................. 382/144 |
| 7,590,968 | B1 * | 9/2009 | Becker et al. .................. 716/21 |
| 2006/0161452 | A1 * | 7/2006 | Hess .............................. 705/1 |
| 2006/0236271 | A1 * | 10/2006 | Zach .............................. 716/1 |
| 2006/0265674 | A1 * | 11/2006 | Scheffer ......................... 716/2 |
| 2007/0118824 | A1 * | 5/2007 | Bae et al. ........................ 716/5 |
| 2008/0147374 | A1 * | 6/2008 | Chan et al. ...................... 703/14 |

* cited by examiner

*Primary Examiner*—Naum B Levin
(74) *Attorney, Agent, or Firm*—Toler Law Group

(57) ABSTRACT

A method, computer system and program product introduce adding a variable performance ranking parameter to a diagram of a circuit to drive implementation of modifications that are yield improving, performance boosting, or performance-neutral. The information is paired to accomplish a more complete design for manufacturability modification in the design of circuits implemented on chips. In this matter, both yield and chip performance are improved.

20 Claims, 4 Drawing Sheets

| | | Sample Ground Rule List for Design Optimization | | | | | | | | | | | |
|---|---|---|---|---|---|---|---|---|---|---|---|---|---|
| GRule | Priority | Intent | Syntax | Value | Yield | P2 | P3 | P4 | P5 | P6 | P7 | P8 | P9 | Perf |
| 114R | 1 | Minimize impact on device | Gate minimum space to RX inner vertex | >=0.1 | Y | .03 | .04 | .05 | .06 | .07 | .08 | .09 | .10 | N |
| 207cR | 1 | Reduce the impact of cap | CA length along PC side to gate width ratio | <28 | Y | .35 | .34 | .33 | .32 | .31 | .30 | .29 | .28 | N |
| 115R | 2 | Minimize impact on device | Gate minimum space to PC inner vertex | >=0.105 | Y | .03 | .04 | .05 | .06 | .07 | .08 | .09 | .105 | N |
| 204eR | 2 | Match device assumptions | Min ratio of CA area to Diffusion area | >=0.05 | Y | .01 | .02 | .02 | .03 | .03 | .04 | .04 | .05 | N |
| 43R | 3 | Avoid litho flare | PC mac den w/ 25um tiling within chipedge | <=35 | Y | 35 | 35 | 30 | 30 | 30 | 25 | 25 | 25 | N |
| 64lcR | 3 | CR, FS avoidance | Mx maximum density with 280 um tiling | <=70 | Y | 70 | 70 | 65 | 65 | 60 | 55 | 50 | 50 | N |
| AC:V46aR | 3 | Chip-to-kerf ACLV | ACLV GATE must be within chipedge | >=70 | Y | 50 | 50 | 55 | 60 | 60 | 65 | 65 | 70 | N |
| 102b1R | MHC | ADLV | PC_end minimum space to PC-end | >=0.12 | N | .10 | .105 | .105 | .11 | .11 | .115 | .115 | .12 | Y |
| 102b2R | MHC | ADLV | PC_end minimum space to PC-side | >=0.115 | N | .10 | .10 | .105 | .105 | .11 | .11 | .115 | .115 | Y |
| DG10aR | MHC | For single-side CA device | Max gate width | <=8 | N | 16 | 15 | 14 | 13 | 12 | 11 | 10 | 9 | Y |
| DG1R | MHC | Promote model accuracy | NFET/PFET max gate length | <=0.8 | N | N | .7 | .6 | .5 | .4 | .3 | .2 | .1 | Y |
| ACMV213aR | Perf | Limit CA density | NFET maximum ratio of CA to gate width | <40 | N | 48 | 47 | 46 | 45 | 44 | 43 | 42 | 41 | Y |
| ACMV270aR | Perf | Optimize film placement | NW min space to NFET ACLV GATE side | >=0.375 | N | .30 | .31 | .32 | .33 | .34 | .35 | .36 | .37 | Y |
| ACMV272R | Perf | Optimize gate end | NW min space to gate end over NACLV_GATE | >=0.26 | N | .18 | .19 | .20 | .21 | .22 | .23 | .24 | .25 | Y |
| ACMV274aR | Perf | Optimize device placement | RX min overlap past NFET ACLV GATE side | >=0.115 | N | .09 | .09 | .10 | .10 | .10 | .11 | .11 | .11 | Y |
| ACMV274bR | Perf | Optimize device placement | RX min overlap past PFET ACLV GATE side | >=0.42 | N | .25 | .25 | .30 | .30 | .35 | .35 | .40 | .40 | Y |

| GRule | Priority | Intent | Syntax | Value | Yield | P2 | P3 | P4 | P5 | P6 | P7 | P8 | P9 | Perf |
|---|---|---|---|---|---|---|---|---|---|---|---|---|---|---|
| Sample Ground Rule List for Design Optimization | | | | | | | | | | | | | | |
| 114R | 1 | Minimize impact on device | Gate minimum space to RX inner vertex | >=0.1 | Y | .03 | .04 | .05 | .06 | .07 | .08 | .09 | .10 | N |
| 207cR | 1 | Reduce the impact of cap | CA length along PC side to gate width ratio | <28 | Y | .35 | .34 | .33 | .32 | .31 | .30 | .29 | .28 | N |
| 115R | 2 | Minimize impact on device | Gate minimum space to PC inner vertex | >=0.105 | Y | .03 | .04 | .05 | .06 | .07 | .08 | .09 | .105 | N |
| 204eR | 2 | Match device assumptions | Min ratio of CA area to Diffusion area | >=0.05 | Y | .01 | .02 | .02 | .03 | .03 | .04 | .04 | .05 | N |
| 43R | 3 | Avoid litho flare | PC mac den w/ 25um tiling within chipedge | <=35 | Y | 35 | 35 | 30 | 30 | 30 | 25 | 25 | 25 | N |
| 641cR | 3 | CR, FS avoidance | Mx maximum density with 280 um tiling | <=70 | Y | 70 | 70 | 65 | 65 | 60 | 55 | 50 | 50 | N |
| AC:V46aR | 3 | Chip-to-kerf ACLV | ACLV GATE must be within chipedge | >=70 | Y | 50 | 50 | 55 | 60 | 60 | 65 | 65 | 70 | N |
| 102b1R | MHC | ADLV | PC_end minimum space to PC-end | >=0.12 | N | .10 | .105 | .105 | .11 | .11 | .115 | .115 | .12 | Y |
| 102b2R | MHC | ADLV | PC_end minimum space to PC-side | >=0.115 | N | .10 | .10 | .105 | .105 | .11 | .11 | .115 | .115 | Y |
| DG10aR | MHC | For single-side CA device | Max gate width | <=8 | N | 16 | 15 | 14 | 13 | 12 | 11 | 10 | 9 | Y |
| DG1R | MHC | Promote model accuracy | NFET/PFET max gate length | <=0.8 | N | N | .7 | .6 | .5 | .4 | .3 | .2 | .1 | Y |
| ACMV213aR | Perf | Limit CA density | NFET maximum ratio of CA to gate width | <40 | N | 48 | 47 | 46 | 45 | 44 | 43 | 42 | 41 | Y |
| ACMV270aR | Perf | Optimize film placement | NW min space to NFET ACLV GATE side | >=0.375 | N | .30 | .31 | .32 | .33 | .34 | .35 | .36 | .37 | Y |
| ACMV272R | Perf | Optimize gate end | NW min space to gate end over NACLV_GATE | >=0.26 | N | .18 | .19 | .20 | .21 | .22 | .23 | .24 | .25 | Y |
| ACMV274aR | Perf | Optimize device placement | RX min overlap past NFET ACLV GATE side | >=0.115 | N | .09 | .09 | .10 | .10 | .10 | .11 | .11 | .11 | Y |
| ACMV274bR | Perf | Optimize device placement | RX min overlap past PFET ACLV GATE side | >=0.42 | N | .25 | .25 | .30 | .30 | .35 | .35 | .40 | .40 | Y |

FIG. 3

VARIABLE PERFORMANCE RANKING AND MODIFICATION IN DESIGN FOR MANUFACTURABILITY OF CIRCUITS

FIELD OF THE INVENTION

The present invention relates generally to design for manufacturability (DFM) of circuits, specifically, integrated circuits implemented on chips, and more particularly, to implementation of modifications to DFM that are yield-improving, performance boosting, or performance-neutral.

BACKGROUND OF THE INVENTION

In the ongoing drive toward smaller, faster and cheaper chips implementing electronic circuits, the design and manufacturing fields are merging. Modem integrated circuit layout is often done automatically using electronic design automation (EDA) tools. EDA tools are a category of tools for designing and producing electronic systems ranging from printed circuit boards (PCBs) to integrated circuits. The term EDA is also used as an umbrella term for computer engineering, computer design and manufacturing of electronics, and the discipline of electrical engineering. EDA is divided into many, and sometimes overlapping, sub-areas. Those areas align with the path of manufacturing from design to mask generation.

As part of the manufacturing and design process of microchips, a designer must be able to design and modify a layout in such a way as to accomplish dual goals. The first goal relates to functionality and performance as well as meeting the requirements of the chip's usage. The second goal relates to manufacturing and laying out the shapes in such a way as to meet fabricator requirements for processing and optimum yield.

In order to achieve these goals, DFM tools have historically focused on meeting the second requirement. More specifically, such tools are used to modify a design of a circuit to make it easier to build in the wafer line, and to provide high yields during production. However, applying all manufacturing rules can often introduce variability in device performance. Thus, a designer needs to be cautious in applying DFM recommendations to performance-sensitive designs.

As technologies evolve and wafer dimensions continually decrease, more performance based rules are introduced. Performance based rules attempt to ensure that devices perform close to a predetermined standard, i.e., a model. However, in order to meet performance based rules, often other changes are made that may negatively impact manufacturability concerns such as yield and critical area.

In general, a designer knows that the circuit layout directly affects circuit performance and yield. It is also known that recommended design practices and rules for improving yield and performance are often in conflict due to space constraints. In the past, one solution included designing the recommendations to a middle ground, i.e., adopting a modified ground rule value without implementing the full DFM recommended value.

A problem with this approach is that there is no efficient manner of determining how critical a particular component, e.g., a Field Effect Transistor (FET), is to overall circuit performance. Thus, modifications may be introduced into a circuit without knowing all the facts. If a particular component is critical and any performance variation detrimental to the overall circuit performance, priority should be given to performance based rules. If the component is not critical in the logic flow, large variations may be tolerated with little or no impact to the end result. In the latter case, priority should be given to non-performance based rules.

Thus, it is desirable to provide a manner of identifying which circuits are critical, and what timing sensitivities exist so that a DFM reviewer or tool can adopt full DFM values for recommended rules on non-critical circuits, while maintaining tighter rules for critical performance based circuits.

SUMMARY OF THE INVENTION

The present invention provides a method, computer system and program product for use in DFM tools that introduces adding variable performance ranking parameters to a circuit diagram, and using device performance inputs to drive the implementation of modifications that are yield-improving, performance boosting, or performance-neutral. By pairing information in a diagram with known cause-effect relationships, a designer may select appropriate modifications to implement a more complete DFM modification that improves yield and device performance.

Embodiments of the present invention provide a method of designing a circuit DFM tools. A diagram of a circuit design may be generated. Variable performance ranking parameters are applied to the diagram and a grading for components of the circuit design may be generated. The diagram of the circuit design may be modified based on the grading.

According to an aspect of the invention, applying of the variable performance ranking parameter comprises assigning a criticality value to components in a circuit design. The values typically comprise a range of values from performance critical to non-critical, and all values in between. Critical values include those relating to a modification made to the placement of a particular component in a circuit that would be detrimental to overall circuit performance. Non-critical values are those that allow for large modifications to be made in a circuit with little to no impact as an end result.

Embodiments may include applying full DFM rules for a circuit design for all components assigned a non-critical value. With respect to critical components, placement may be adjusted to increase performance of the circuit.

Another aspect of the invention includes a computer system for designing a circuit using DFM tools. First code is provided for generating a diagram of the circuit design. Second code is configured for applying a variable performance ranking parameter to the diagram, and for generating a grading for components of the circuit design. Third code is adapted for modifying the diagram of the circuit design based on the grading. The system is further adapted for implementing specific steps as previously described.

In another aspect, a program product is provided on storage medium, which can be a single storage medium or multiple storage medium, e.g., distributed throughout a network. First code on the storage medium is configured for generating a diagram of a circuit designed according to design for manufacturability rules. Second code is provided for applying a variable ranking parameter to the diagram and for generating a grading for components of the circuit design. Third code is also provided for modifying the diagram of the circuit design based on the grading.

BRIEF DESCRIPTION OF THE DRAWINGS

FIG. 3 is a table illustrating an example of design rules and showing values that may be applied in a design.

DETAILED DESCRIPTION

In one respect, embodiments consistent with the invention may capitalize on implementing a variable performance ranking parameter through a diagram of a circuit being designed. Embodiments may use device performance inputs to drive the implementation of modifications that are yield-improving, performance boosting, or performance-neutral. More specifically, aspects of the invention implement such rules in the context of DFM values. By pairing information contained in the result in a diagram of a circuit with known cause and effect relationships (as established by modeling and hardware studies, understanding of stress effects, etc.) appropriate modifications may be selected and implemented to accomplish a DFM modification that improves yield and device/chip performance.

By utilizing specific inputs, a number of benefits are achieved. Non-critical circuits have yield improvements applied to them without being overly conservative to ensure no performance degradation. Critical circuits have specific improvements applied that improve yield and performance. More specifically, yield-improving modifications that degrade performance are not implemented, balancing the needs of the designer with those of the wafer fabricator.

Figure 1:
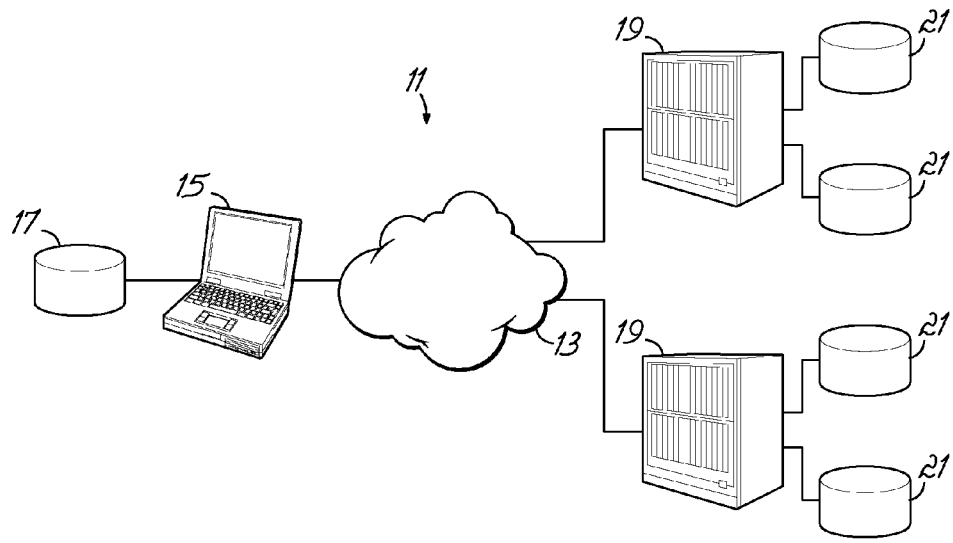
FIG. 1 is a diagram illustrating an exemplary system in which the invention may be implemented.

FIG. 1 illustrates an environment exemplary of how the invention may be implemented. A network 13 may include terminals 15 that may have self-contained memory and or may be attached to local storage devices 17 that contain data and DFM tools therein. In addition, such DFM tools can be implemented through the network 13 and run on servers 19 also connected to storage 21 that may also implement the DFM tools in accordance with aspects of the invention.

Figure 2:
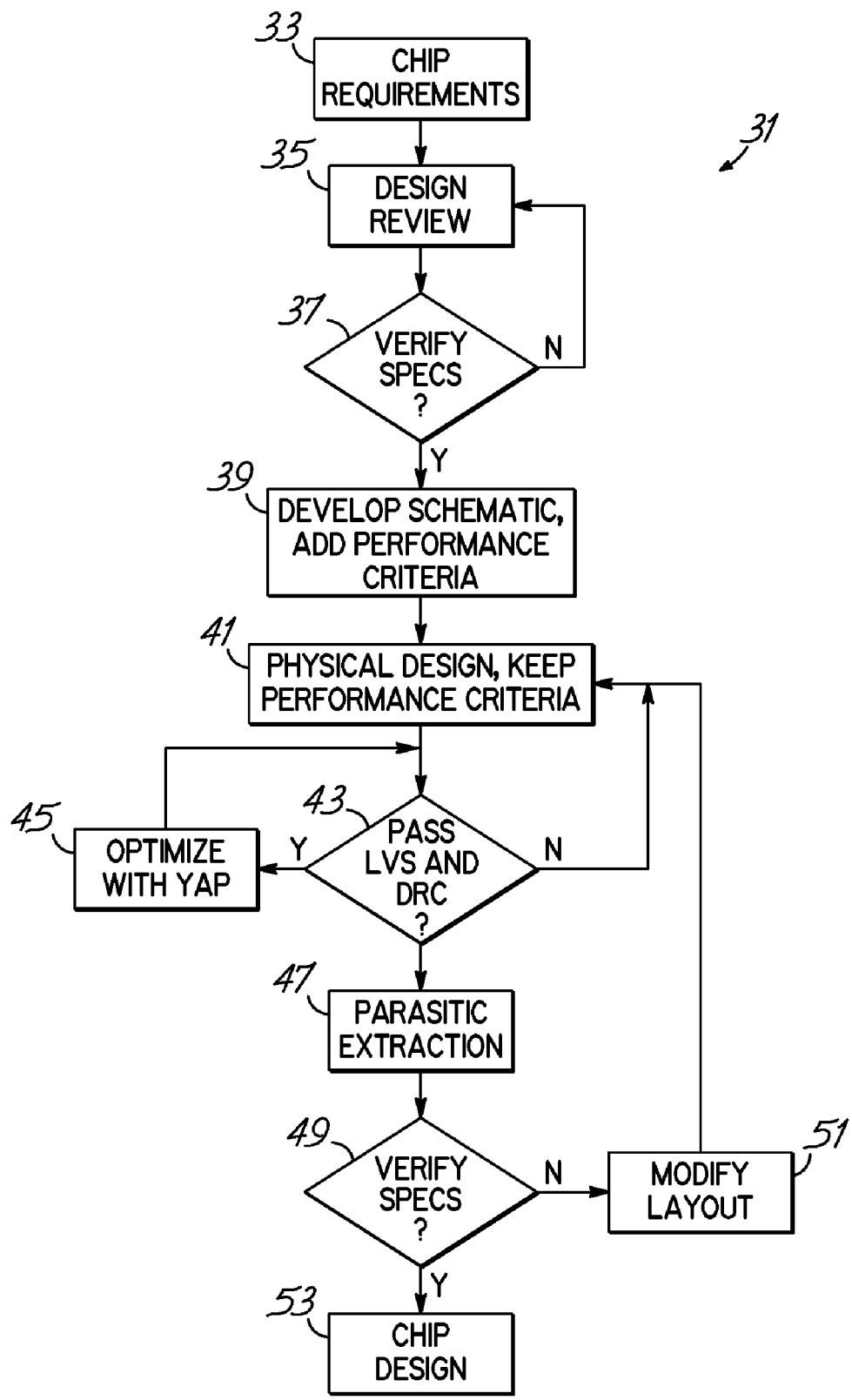
FIG. 2 is a sample flow chart illustrating where inputs may be made into the design of a circuit and where improvements in application of DFM rules may be implemented.

FIG. 2 is a flow diagram 31 illustrating how an embodiment of the invention may be implemented. The flow diagram 31 is an overview of chip design process and development of a diagram. Steps 39 and 41 are exemplary of a specific implementation in accordance with aspects of the invention that result in an improved diagram as further described herein.

More specifically, chip requirements are input at step 33 into the system and a design review is conducted at step 35. The specifications for the design are verified at step 37. If the verification fails, the process returns to the design review at step 35. If the verification shows that the design is valid, then a diagram for the circuit is developed at step 39 as further described herein, performance criteria for the diagram of the circuit is added. A physical design for the circuit is generated at step 41 keeping the performance criteria from step 39. LVS and DRC verification is then tested at step 43. LVS refers to Layout Versus Schematic and DRC refers to Design Rules Check, both standard industry terms.

If the test fails, the process returns to step 41 where the physical design is modified. If the test passed at 43, at step 45 an optimization is made relative to yield and performance in the chip design. This process returns again to step 43, and then proceeds to step 47. At step 47 a simulation with the tool is run at step 49 and includes a test run to verify that the circuit will operate as designed. If the verification is complete, then the specifications are passed to the chip designer at step 53. If the design does not operate as desired, then the layout is modified at step 51 and the process returns back to step 41.

FIG. 3 is a table that illustrates design rules showing the intermediate values that might be applied depending on circuit grading. The table of FIG. 3 is conventional and readily understood by those of ordinary skill in the art. By way of further illustration of how the aspects of the invention are implemented, the following table identifies two ground rules that are in conflict and may be implemented as shown in FIGS. 4-7.

| Ground Rule | DRC Minimum | Recommended Rule (R) |
|---|---|---|
| Recommended PC minimum space and notch (GR102(R)) | <=0.030 | <=.105 |
| Recommended Gate minimum space to PC inner vertex (GR115(R)) | <=0.030 | <=.105 |

Figure 4:
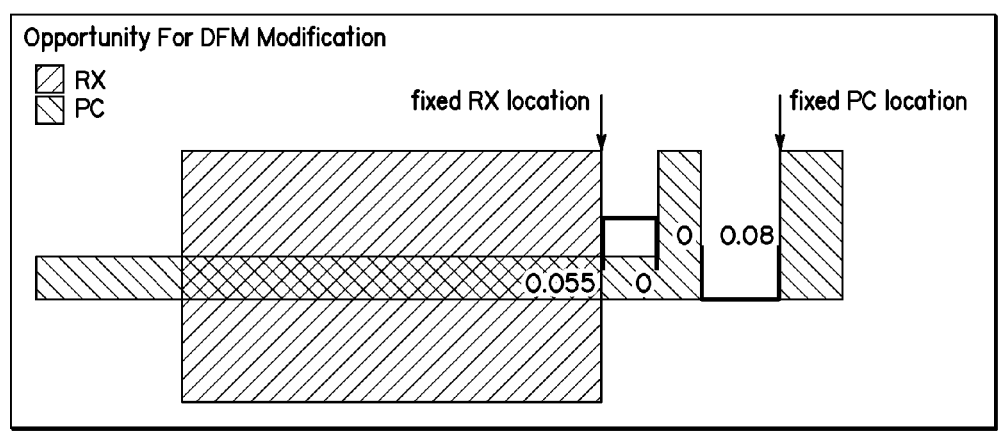
FIG. 4 is a diagram of a circuit resulting from implementation of design for manufacturability rules.
Figure 5:
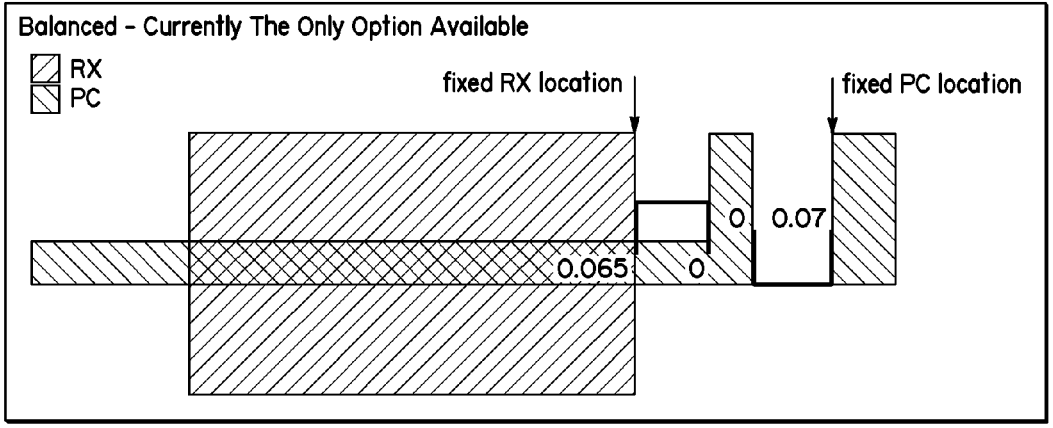
FIG. 5 is a diagram illustrating a balanced approach for modifying the circuit when two ground rules conflict, with no consideration for the criticality of performance of an FET that is moved.

FIG. 4 is a diagram for a circuit generated without employing conventional DFM rules. In implementing the embodiment, the table above illustrates two rules in conflict. The ideal situation would be to pass all recommended rules. However, this is not possible due to the fixed PC (Polysilicon) and RX (Diffusion) location, which are the two main components of an FET. The PC overlaps the RX to form a gate with a diffusion on each side. In a conventional manner, the prior art solution was to find a balance between the tools due to the lack of information from the diagram so that the only sensible approach was to balance the two ground rules equally as illustrated in FIG. 5.

Figure 6:
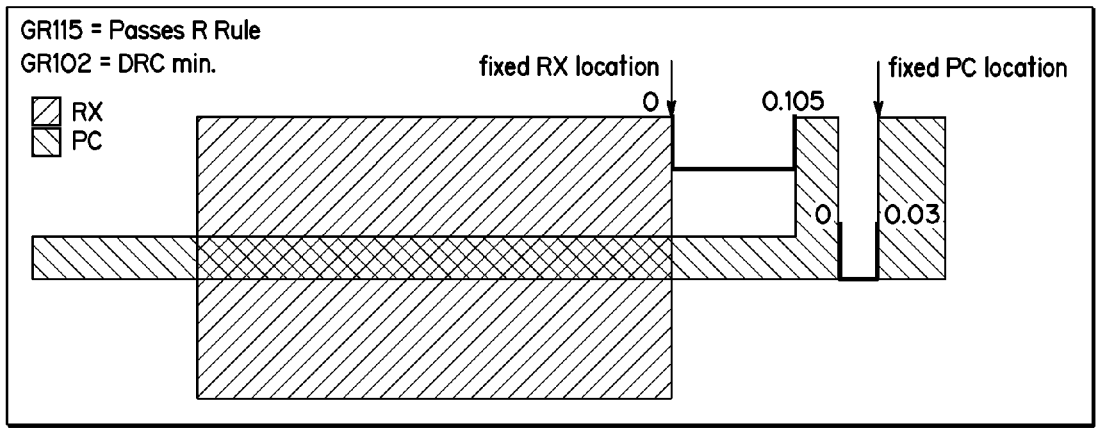
FIG. 6 is a modified diagram of a circuit skewed toward satisfying a performance oriented ground rule in conflict with another ground rule.

FIG. 6 illustrates a modification in which priority is skewed towards satisfying the performance oriented ground rule for recommended minimum space to PC inner vertex, exemplified as GR115(R).

Figure 7:
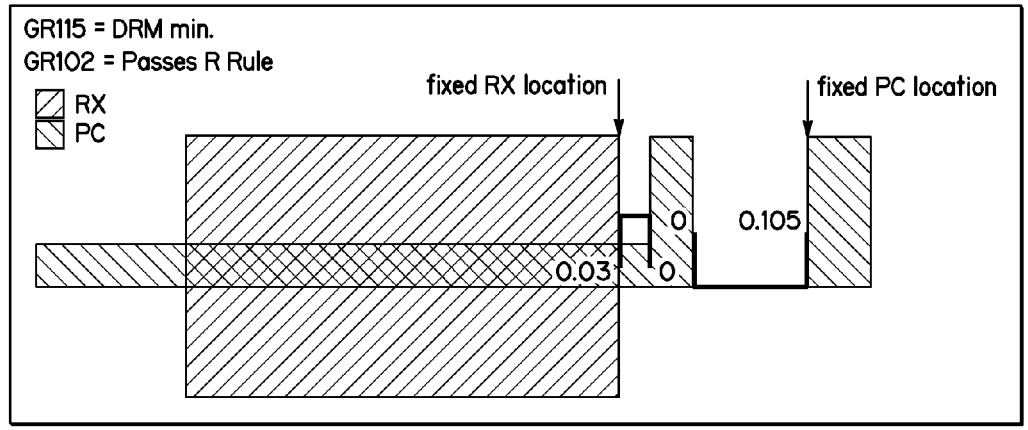
FIG. 7 is a modified diagram of a circuit skewed toward satisfying a manufacturability oriented ground rule in conflict with a performance oriented ground rule.

FIG. 7 illustrates a result with the priority skewed towards satisfying the manufacturability oriented ground rule for recommended PC minimum space and notch, exemplified as GR102(R).

In considering the examples, it is important to understand that they represent extremes and that the actual solution may be any distance in between, and depends on the performance criticality rating and the priorities associated with each individual ground rule, as will be apparent to those of ordinary skill.

In implementing the invention, the information is directly added to the diagram and can be read directly into the automated tools adding an additional parameter in the decision making process.

While the present invention has been illustrated by a description of various embodiments and while these embodiments have been described in considerable detail, it is not the intention of the Applicants' to restrict, or any way limit the scope of the appended claims to such detail. The invention in its broader aspects is therefore not limited to the specific details, representative apparatus and method and program product, and illustrative example shown and described. Accordingly, departures may be made from such details without departing from the spirit or scope of Applicants' general inventive concept.

What is claimed is:

1. A method of designing a circuit using design for manufacturability (DFM) tools, comprising:

generating a diagram of a circuit designing using predetermined ground rules used to determine placement of a plurality of components in the circuit design, wherein the predetermined ground rules include at least one performance-based rule and at least one DFM-based rule, wherein the at least one DFM-based rule is associated with a DFM recommended value;

storing the diagram of the circuit design within a storage device;

applying a variable performance ranking parameter to said diagram of the circuit design by assigning to a component of the circuit design a criticality value selected from a plurality of criticality values ranging from a performance critical value to a non-critical value and generating a grading using the criticality value assigned to the component of said circuit design; and modifying placement of a first component assigned the performance critical value based on said grading when two or more of the predetermined ground rules are in conflict to improve yield during manufacturing without degrading performance, wherein the DFM recommended value is applied to a second component assigned the non-critical value.

2. The method of claim 1, further comprising skewing the placement of the first component towards satisfying the performance-based rule and away from the satisfying the DFM-based rule.

3. The method of claim 2, wherein a degree of the skewing is determined by the grading.

4. The method of claim 1, further comprising assigning a higher priority to the perfomance-based rule than to the DFM-based rule.

5. The method of claim 1, further comprising assigning a lower priority to the performance-based rule than to the DFM-based rule.

6. The method of claim 1, wherein modifying placement of the first component further comprises modifying a recommended placement value.

7. The method of claim 1, further comprising receiving circuit design requirements.

8. The method of claim 1, further comprising performing a simulation using the diagram of the circuit design.

9. The method of claim 1, further comprising receiving the predetermined ground rules.

10. The method of claim 1, further comprising performing a layout versus schematic check on the diagram of the circuit design.

11. The method of claim 1, further comprising performing a design rules check on diagram of the circuit design.

12. The method of claim 1, further comprising determining an intermediate value associated with the placement of the first component using the assigned critical value.

13. A computer system for designing a circuit using design for manufacturing (DFM) tools, comprising:

first code for generating a diagram of a circuit design using predetermined ground rules used to determine placement of a plurality of components in the circuit design, wherein the predetermined ground rules include at least one performance-based rule and at least one DFM-based rule, wherein the at least one DFM-based rule is associated with a DFM recommended value;

second code for applying a variable performance ranking parameter to said diagram of the circuit design by assigning to each of the components of the circuit design a criticality value selected from a plurality of criticality values ranging from a performance critical value to a non-critical value and generating a grading using the criticality values assigned to the components of said circuit design; and third code for modifying placement of a first component assigned the performance critical value based on said grading when two or more of the predetermined ground rules are in conflict to improve yield during manufacturing without degrading performance, wherein the DFM recommended value is applied to a second component assigned the non-critical value.

14. The computer system of claim 13, wherein the third code is configured to skew the placement of first component towards satisfying the performance-based rule and away from the satisfying the DFM-based rule.

15. The computer system of claim 14, wherein a degree of the skewing is determined by the grading.

16. The computer system of claim 13, wherein the second code is configured to assign a higher priority to the performance-based rule than to the DFM-based rule.

17. The computer system of claim 13, wherein the second code is configured to assign a lower priority to the performance-based rule than to the DFM-based rule.

18. The computer system of claim 13, wherein modifying placement of the first component further comprises modifying a recommended placement value.

19. The computer system of claim 13, wherein the third code is configured to determine an intermediate value associated with the placement of the first component using the assigned critical value.

20. A program product, comprising:

a tangible storage medium; and first code on said storage medium configured for generating a diagram of a circuit design according to predetermined ground rules used to determine placement of components in the circuit design, wherein the predetermined ground rules include at least one performance-based rule and at least one design for manufacturing (DFM)-based rule, wherein the at least one DFM-based rule is associated with a DFM recommended value, second code for applying a variable ranking parameter to said diagram of the circuit design by assigning to each of the components of the circuit design a criticality value selected from a plurality of criticality values ranging from a performance critical value to a non-critical value and generating a grading using the criticality values assigned to the components of said circuit design, and third code for modifying placement of a first component assigned the performance critical value based on said grading when two or more of the predetermined ground rules are in conflict to improve yield during manufacturing without degrading performance, wherein the DFM recommended value is applied to a second component assigned the non-critical value.

* * * * *